United States Patent [19]

Yoshida et al.

[11] Patent Number: 4,458,265

[45] Date of Patent: Jul. 3, 1984

[54] COLOR IMAGE DUPLICATING SYSTEM

[75] Inventors: Kunio Yoshida; Hiroaki Kotera; Yukifumi Tsuda, all of Kawasaki; Yoshimitsu Kanno, Sagemihara; Motohiko Naka, Kawasaki, all of Japan

[73] Assignee: Matsushita Research Institute Tokyo, Inc., Kawasaki, Japan

[21] Appl. No.: 332,098

[22] Filed: Dec. 17, 1981

[30] Foreign Application Priority Data

Dec. 17, 1980 [JP] Japan .................. 55-179423
Dec. 17, 1980 [JP] Japan .................. 55-179424

[51] Int. Cl.³ .............. H04N 1/46; G03F 3/08
[52] U.S. Cl. .................... 358/80; 358/78
[58] Field of Search .......... 358/80, 78, 75, 30, 358/310, 314

[56] References Cited

U.S. PATENT DOCUMENTS

| | | | |
|---|---|---|---|
| 4,275,413 | 6/1981 | Sakamoto | 358/80 |
| 4,305,093 | 12/1981 | Nasu | 358/78 |
| 4,305,094 | 12/1981 | Yamada | 358/80 |
| 4,307,415 | 11/1981 | Sundermeyer | 358/80 |
| 4,328,515 | 5/1982 | Wellendorf | 358/80 |
| 4,335,398 | 6/1982 | Yamada | 358/80 |
| 4,344,086 | 8/1982 | Mizuno | 358/78 |

Primary Examiner—Tommy P. Chin
Attorney, Agent, or Firm—Birch, Stewart, Kolasch & Birch

[57] ABSTRACT

A color image duplicating device comprises a function generator (60) for generating a plurality of functions of n degree wherein elements of color separated data (201, 202, 203) from a color original (1) are variable, a storing device (66) for storing predetermined coefficients, and an arithmetic unit (61, 62, 63) for performing the calculation to find the product and sum of outputs from the function generator (60) and that of the storing device (66). An output from the arithmetic unit (61, 62, 63) is applied to a color recorder (3) to form a color duplicated image.

13 Claims, 6 Drawing Figures

COLOR IMAGE DUPLICATING SYSTEM

Field of the Art

The present invention relates to a color image duplicating device for use in a recording apparatus, such as a color facsimile machine and a color ink jet printer, of a type effective to record an image of natural color having a half-tone of color.

Background Art

A remarkable progress has recently been made in the field of image recording technology using an ink jet printer, some of which are increasingly applied in drawing a color image. However, most of these techniques pertain to the reproduction of either a mere multi-color image or a psudo-color image and do not respond to the demand for devices capable of reproducing a color image with high fidelity.

When it comes to the recording of a color image by the use of an ink jet printer, the reproductivity of the color tends to be adversely affected by the following problems:

(1) Deviation from the proportionality rule of the single color density of the ink relative to the magnitude of the applied electrical signal, and (2) Deviation from the additivity rule of the reproduced color density relative to the density of each color element during the recording which is carried out by superimposing inks of different colors.

On the other hand, according to the recent state of the art, the color recording effected by the use of the ink jet printer wherein colored inks are used can give a reproductivity of tones falling within a hatched area in a CIE color standard chart shown in FIG. 1 and is satisfactory in giving a reproduction of an image of natural color so far as the range of color reproductivity is concerned.

However, it is difficult to prepare an ink having an optical characteristic free from the problems (1) and (2) above, particularly the second mentioned problem (2), and, at the same time, a physical characteristic suited for use in the ink jetting. Because of this, attempts have been made to obtain a wide range of high fidelity color reproduction characteristics by the use of such a linear or secondary functional masking method as used in a printing process, but have not been led to success.

By way of example, in the case where the color reproduction is to be carried out according to the subtractive mixing method by the use of an ink jet printer in a color facsimile machine, a simple linear masking has failed to effect a satisfactory color correction because numerous factors such as the unnecessary absorption characteristic of three primary color pigments, the proportionality rule, the additivity rule, the printing characteristics of a recording paper and inks and others are correlated to each other Hereinafter, the prior art device will be described with particular reference to FIG. 2. Shown in FIG. 2 is a fundamental arrangement of component parts of the prior art image duplicating device comprising a separating means 2, such as three primary color separating optics, for separating the color tone into three color components and a color ink jet printer 3 utilizing three types of colored inks. The color separating means 2 includes a beam splitting system 28 comprised of, for example, a filter or a dichroic mirror for separating a beam of light 11, which has been reflected from an original 1 illuminated by a light source 27, into three color components each having its own weight dependent on a predetermined spectral characteristic, said three color components being converted by respective logarithmic conversion amplifiers 24, 25 and 26 into three electrical signals 201, 202 and 203 which, in combination, correspond to the spectral distribution of the reflected light beam 11. The printer 3 comprises, for example, three ink jetting heads 34, 35 and 36 and their associated drive circuits 31, 32 and 33 and is operable to jet three color inks 301, 302 and 303 in respective amounts proportional to the electrical signals 201, 202 and 203 towards a recording medium 4 to form a duplicated color image. The original 1 and the recording medium 4 are moved in synchronism with each other. The color image duplicating device of the construction described above is, although simple in principle, ineffective to reproduce a practically utilizable color image of natural tone since, even though the mismatching the primary color system of the inks and the equivalent three primary colors of the color separating means is neglected, the color reproductivity of a color mixed area is insufficient because of the problems described above.

Shown in FIG. 3 is another prior art color image duplicating device wherein a so-called masking processing circuit 5 is added to the construction shown in FIG. 2 to achieve an improvement over the device shown in FIG. 2. The circuit 5 includes weighting circuits 511, 512, 513, 521, 522, 523, 531, 532 and 533 for weighting the input signals 201, 202 and 203 and adders 51, 52 and 53 for performing an addition to give output signals 501, 502 and 503. Assuming that the input signals 201, 202 and 203 are expressed by x1, x2 and x3, respectively, and the output signals 501, 502 and 503 are expressed by y1, y2 and y3, respectively, and also assuming that the weighting coefficient is expressed by bij wherein i represents 1, 2 or 3 and j represents 1, 2 or 3, the following relationship can be obtained as is well known to those skilled in the art.

$$Yi = \sum_{j}^{3} bij \times j \,(1, 2, 3) \tag{1}$$

If the value of bij is carefully selected, a duplicated color image better in color reproductivity than that obtained by the device of FIG. 2 can be obtained.

However, this linear masking processing cannot obviously eliminate any possible error in color reproductivity resulting from the non-linear characteristic in the problems (1) and (2) above as a rule.

On the contrary thereto, the Japanese Laid-open Patent Publication No. 49-106714 discloses the use of means for effecting a color correction including a non-linear characteristic more strictly. According to this publication, in order to obtain a desirable color print while color separated signals representative of red (R), green (G) and blue (B) are used as input signals, respective amounts of cyan (C), magenta (M) and yellow (Y) inks are determined by selecting a table memory wherein C, M and Y signals representative of corrected colors corresponding to a combination of R, G and B have been stored. According to this method, there are some advantages in that a relatively free color compensating curve can be introduced and in that the precision can be improved by the utilization of a digital engineering technology, and this method can be considered an advanced method as compared with the previously described linear analog processing system. However, even this method has a disadvantage in that, since all possible results of combination of C, M and Y must be stored relative to all possible combination of R, G and B, the device itself tends to be complicated in structure and expensive as is evidenced by the fact that the Japanese Laid-open Publication No. 49-106714 and its related Japanese Laid-open Patent Publications No. 52-12001, No. 52-24701 and No. 52-37101 disclose improvements in means for saving the storing amount and means for efficiently performing calculation with the correction amount divided into variable and fixed elements. However, even when these improved means are to be utilized, a practical circuit arrangement can hardly be realized and, if possible, will become expensive.

Disclosure of the Invention

The present invention has for its object, as hereinbefore described, to provide a color image duplicating device, wherein the relationship between the input level at each of the input terminals and the density of the output color corresponding thereto cannot approximate to each other with a masking equation of low degree, with means for effecting correction to the color reproduction effectively so that a high quality color image having a minimized error in color between the original and the reproduced color.

In order to accomplish the above described object, the color image duplicating device according to the present invention comprises a color separator for scanning an original color image and obtaining m color separated data from each picture element, a recorder for recording a color image by combining l primary colors, a function generating means for generating row vectors $\overline{F(X)}$ of n degree having as an element n functions wherein an element of $\overline{X}$ is a variable relative to a color separated vector data $\overline{X}$ comprised of said m elements, means for storing each element in a matrix (A) having l lines and n rows, and arithmetic means for obtaining, by the utilization of the matrix (A) and the vectors $\overline{F(X)}$, obtaining a row vector $\overline{Y}$ of l degree which is expressed by $\overline{Y}=(A)\overline{F(X)}$, said $\overline{Y}$ being supplied as an input to the recorder to give a duplicated image of corrected color.

According to the present invention, even when a color recorder which exhibits a complicated irregularity which cannot be simulated by the conventional masking equation, an ideal color reproduction characteristic can be obtained by the utilization of both arbitrary function forms and weighting coefficients. More specifically, by additionally utilizing arbitrary function generators, weighting adders and a color correction calculator comprised of means for storing the weights thereof, it is possible to obtain a high quality color image duplicating device. In addition, the above described technique is applicable with electrical signals which may be either an analog form or a digital form and, therefore, the function generator or the color correction calculator may be in the form of a digital memory device and it is possible to freely utilize the complicated functions for the correction.

Moreover, the matrix (aij) of coefficients can be calculated with no special means used, but by the use of the image duplicating device itself. More specifically, by utilizing the color separator of the color image duplicating device as a color measuring means and by applying a technique for measuring the characteristic of the color recorder, an optimum value can automatically be derived. Accordingly, by introducing the previously described algorithm for the calculation of the coefficients into the duplicating device itself, change of various conditions can be coped with. By way of example, in the case of the ink jet printer, the coefficient can be optimized from time to time as desired relative to change in characteristic of the recording heads and/or change in type of the recording material such as inks and recording paper, thereby producing a high quality reproduced color image. The algorithm for the calculation of the coefficients can be realized by connecting a compact computer, for example, a microcomputer, with the calculator.

Furthermore, according to the present invention, the color image duplicating device may comprise means for simulating the non-linear characteristic with a polynomial expression wherein the color separated input signals are variables and for generating each term of the polynomial expression as a function, and means for giving a correction coefficient for each term as a parameter, so that a desirable corrected color output can easily be obtained at a high speed.

BRIEF DESCRIPTION OF THE DRAWINGS

These and other objects and features of the present invention will become clear from the subsequent description taken in connection with a preferred embodiment thereof with reference to the accompanying drawings, in which.

Best Mode For Carrying out the Invention

Figure 1:
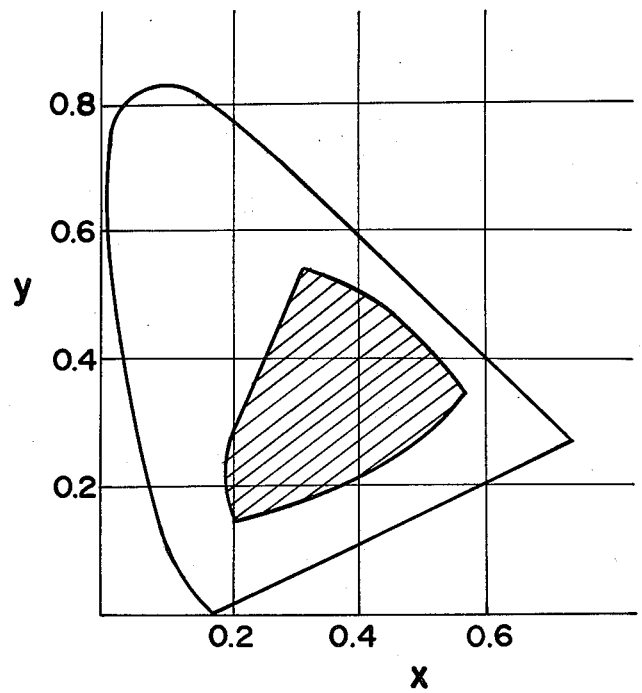
FIG. 1 is a chart showing a preferred range of color reproduction achieved by the ink jet recording device.
Figure 2:
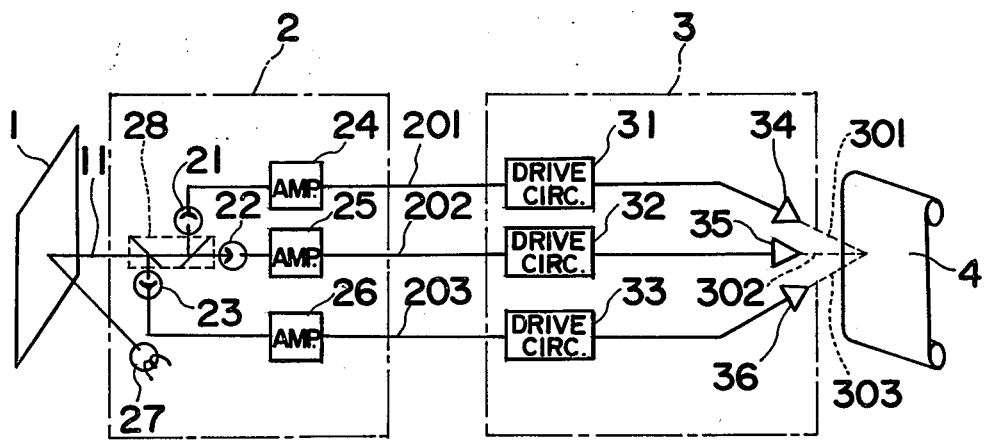
FIG. 2 is a circuit block diagram showing a fundamental color image duplicating device.
Figure 3:
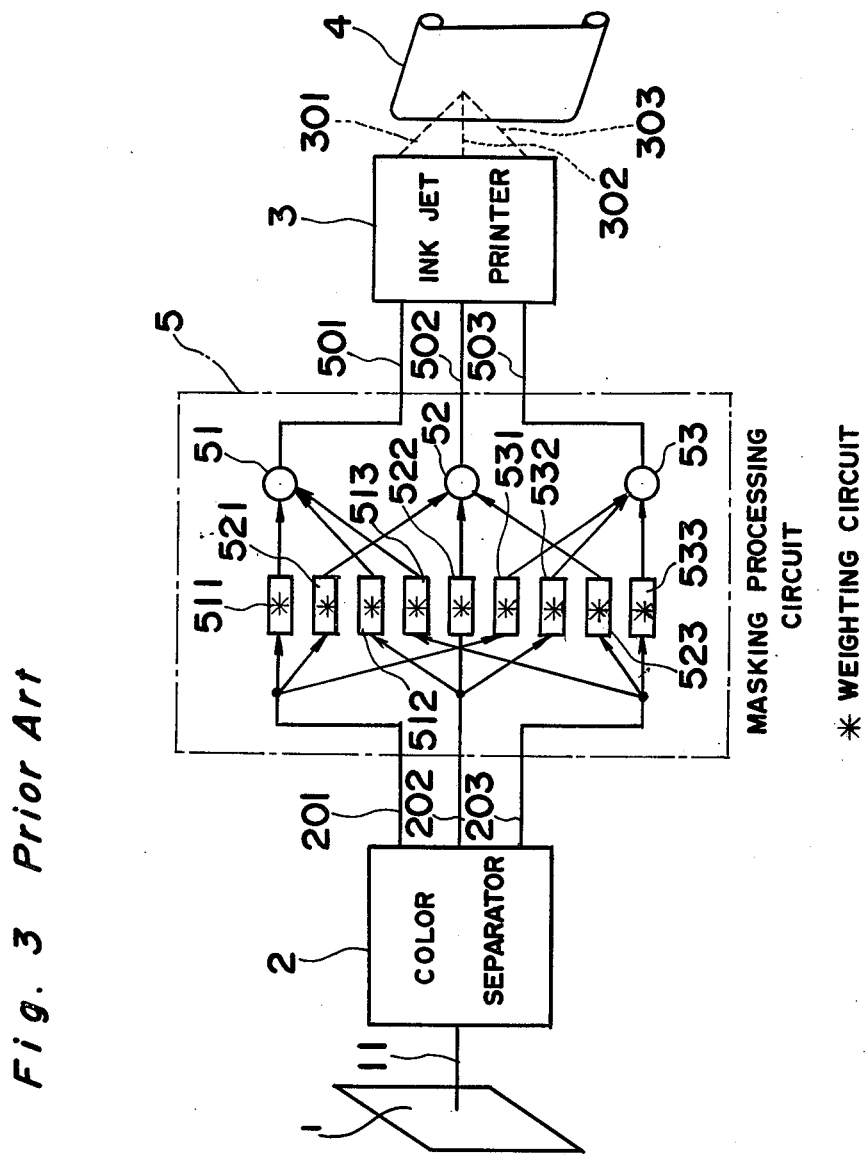
FIG. 3 is a circuit block diagram showing the prior art color image duplicating device wherein a primary masking is utilized.
Figure 4:
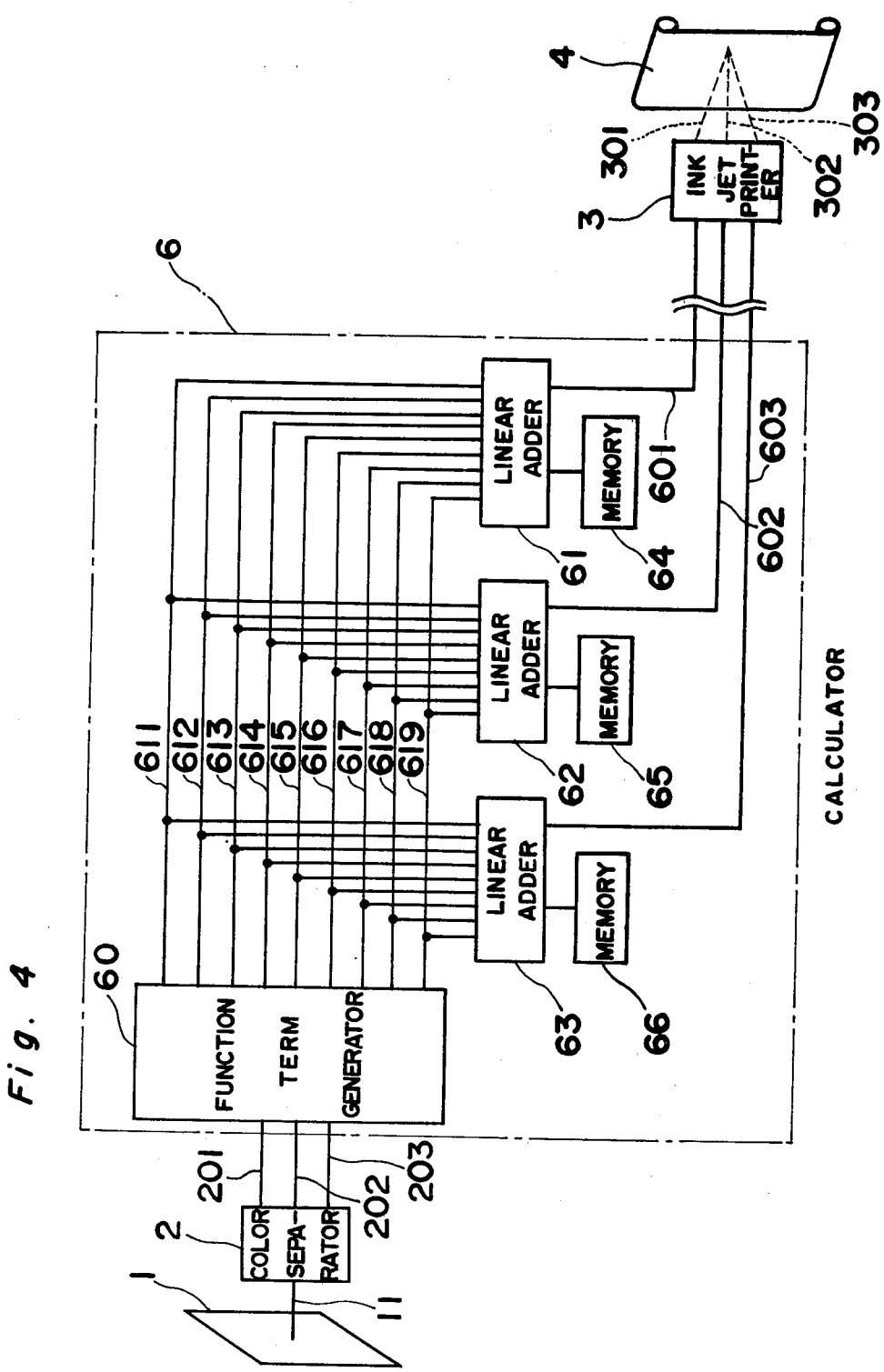
FIG. 4 is a circuit block diagram showing a color image duplicating device according to a preferred embodiment of the present invention.

Referring to FIG. 4, there is shown a preferred embodiment of a color image duplicating device according to the present invention. For the purpose of the description of the present invention, the color separation and the recording will be described as using three colors as is the case with the previous description of the prior art duplicating devices. The output signals 201, 202 and 203 received by a calculator 6 are converted by a function term generator 60 into a plurality of, for example, nine, function groups 611, 612, ... 618 and 619 which are hereinafter referred to as f1, f2, ... fj ... f8 and f9. In other words, the function term generator 60 is operable to generate row vectors $\overline{F(X)}$ of new n degree having as their elements n (in this case, n=9) functions f1, f2, ... fj ... f8 and f9 wherein elements of $\overline{X}$ are variables relative to the color separated vector data $\overline{X}$ which is outputs from the color separating means 2. More specifically, so that the color separated vector data $\overline{X}$ supplied can be utilized as address data to derive the value of the function $\overline{F(X)}$ readily, it may be constructed in the form of a table memory wherein the output $\overline{F}$ relative to $\overline{X}$ is stored in the form of a table.

The linear adders 61, 62 and 63 are operable to produce the product and sum by the utilization of coefficients preset in the memories 64, 65 and 66 relative to nine inputs, respectively, and to generate outputs 601, 602 and 603, which are hereinafter referred to as y1, y2 and y3, respectively. Accordingly, assuming that the inputs 201, 202 and 203 are respectively expressed by x1, x2 and x3 and the contents of the coefficients of the memories 64, 65 and 66 are respectively expressed by a1j, a2j and a3j wherein j represents 1, 2, 3 ... 8 or 9, the following relationship can be obtained.

$$Y_i = \sum_{j=1}^{9} a_{ij} f_j (x1, x2, x3) \quad (2)$$

These y1, y2 and y3 drive the color printer 3 to effect the reproduction of a duplicated color image on the recording medium 4. If one desires to obtain a complete and faithful reproduction of the color image, the form of the function fj and the value of the coefficient aij must be determined. However, since it is generally difficult to completely express the value of the spectral density of each ink on the recording medium 4 relative to the original color system in the form of a function wherein the input level is a variable in a masking equation, the equation (2) above cannot readily be determined.

However, in practice, in the case of the color recorder wherein an ink jet recording head of an on-demand type is utilized, a series of experiments conducted have shown that, if x1, x2, x3, x1$^2$, x2$^2$, x3$^3$, x1.x2, x2.x3, or x3.x1 is used for fj when the input xi represents the density relative to the three colors of red, green and blue, a satisfactory correction result can be obtained.

Hereinafter, a method for the determination of an optimum value for the coefficient aij in the present invention when the function fj has been determined will be described. In the first place, the calculator 6 is separated from the duplicating device to eliminate the correction operation. In this condition, a combination $\bar{Z}k$ (k=1, 2, ... N) of inputs falling within the range of the input vectors 601, 602 and 603 to the printer 3 is prepared at random or as a combination of suitable values, and is successively applied to input terminals of the printer 3 to give a color sample of N colors. N should be a value sufficiently larger than the number of the coefficients aij (in this case, 27 because i=1 to 3 and j=1 to 9). $\bar{Z}k$ represents respective levels of drive signals supplied to the three input terminals in the case of the three color recorder now under discussion, k being expressed as follows:

$$\bar{Z}k = \begin{pmatrix} Z1k \\ Z2k \\ Z3k \end{pmatrix} \quad (3)$$

Affixes 1, 2 and 3 correspond to, for example, cyan, magenta and yellow colors of the recorder, respectively.

In the next place, the color sample of the N colors is supplied to the color separating means 2 to effect a color separation and, then N combinations of electrical signals $\bar{X}k$ (k=1, 2, ... N) appearing at the output terminals 201, 202 and 203 are measured. $\bar{X}k$ has three separated color components corresponding to $\bar{Z}k$, the measured value of the k-th color sample being expressed as follows.

$$\bar{X}k = \begin{pmatrix} X1k \\ X2k \\ X3k \end{pmatrix} \quad (4)$$

If at this time (aij) is so determined as to establish the following relationship;

$$\bar{Z}k = \sum_{j=1}^{9} a_{ij} f_j (\bar{X}k)$$

the equation (2) above satisfies conditions required to achieve the optimum color reproduction. This is such as to determine the coefficient matrix (aij) under the function group fi (i=1, 2, ... 8 and 9) so that an error in the following equation can be minimized:

$$\epsilon = \sum_{k=1}^{N} \left\{ \left\| Zk - (a_{ij}) \begin{pmatrix} f_1(\bar{X}k) \\ f_2(\bar{X}k) \\ \vdots \\ f_9(\bar{X}k) \end{pmatrix} \right\| \right\} \quad (5)$$

wherein $\|\ldots\|$ represents norm. More specifically, it is satisfactory to solve simultaneous equations (in this case, three sets of nine simultaneous equations) obtained by differentiating the equation (5) above with each aij.

That is, since the following relationship can be established relative to each element aln in the matrix (aij);

$$\frac{\partial \epsilon}{\partial a_{ln}} = \frac{\partial}{\partial a_{ln}} \left\{ \sum_{k=1}^{N} \sum_{i=1}^{3} \left( Z_{ik} - \sum_{j=1}^{9} a_{ij} f_j (\bar{X}k) \right)^2 \right\} \quad (6)$$

$$= -2 \sum_{k=1}^{N} f_n(\bar{X}k) \cdot \left( Z_{lk} - \sum_{j} a_{lj} f_j(\bar{X}k) \right)$$

the condition required to minimize the error is satisfied when the following relationship can be established while the equation (6) above is set to be zero:

$$\sum_{k} f_n(\bar{X}k) Z_{lk} = \sum_{k} f_n(\bar{X}k) \sum_{j} a_{lj} f_j(\bar{X}k) \quad (7)$$

$$= \sum_{j} a_{lj} \sum_{k} f_n(\bar{X}k) \cdot f_j(\bar{X}k)$$

For the purpose of simplification, if:

$$\sum_{k} f_n(\bar{X}k) Z_{lk} = \alpha_{ln} \quad (8)$$

$$\sum_{k} f_n(\bar{X}k) f_j(\bar{X}k) = \beta_{nj} \quad (9)$$

then, the equation (7) above becomes as follows:

$$\alpha_{ln} = \sum_{j} a_{lj} \beta_{nj} \quad (10)$$

From the foregoing, the conditions for the minimized error with respect to all n and j can be obtained as a solution to the following matrix equation:

$$(alj) = (aln)(\beta nj)^{-1} \quad (11)$$

The functions fj(x1, x2, x3) in the equation (2) above are, so far as the above example is concerned, in the form of a quadratic equation. However, by increasing the degree, for example, by adding higher degree terms such as x1³, x2³, x3³, x1²·x2, x2²·x3, x3²·x1, x1·x2·x3, and so on, the preciseness of the color reproduction can further be improved. Moreover, even if the same terms are employed, it is possible to obtain the correction effect suited for the non-linearity of the recorder and the recording material by suitably selecting the form of the functions. Table 1 illustrate the forms of six functions different from the above quadratic equations. However, in Table 1, the three separated color signals x1, x2 and x3 represent respective outputs representative of reflective indexes of the color separator, wherein 0 < x1, x2, x3 < 1. It is also to be noted that the last element 1 represents a component of the constant term.

Results of comparison experiments wherein 512 color samples were actually prepared by the use of the color ink jet recorder with respect to these six function groups, optimum coefficients were then calculated and the magnitudes of reproduction errors were converted into level values of the three color (cyan, magenta and yellow) signals applied to the recorder, are tabulated in Table 2, from which is is clear that the function group 1 brought about the best result.

the function generating means, the memory and the calculating means in the form of a digital memory device and to make the output $\overline{Y}$ corresponding to $\overline{X}$ memorized in the form of a table so that the result $\overline{Y}$ can readily be derived with the input $\overline{X}$ used as an address data.

Figure 5:
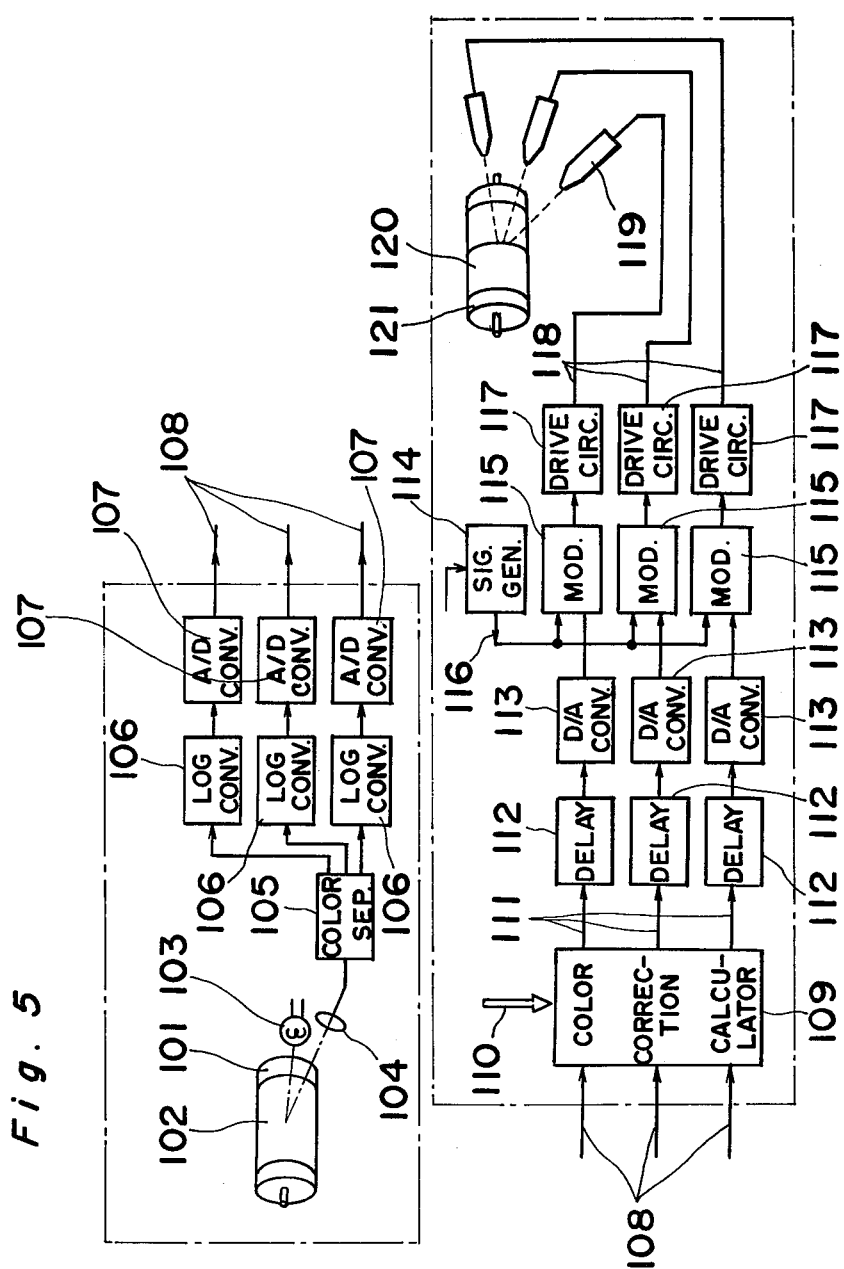
FIG. 5 is a circuit block diagram showing an example in which the present invention is applied to a color facsimile machine utilizing an ink jetting system.

FIG. 5 illustrates a circuit block diagram showing a specific embodiment of the present invention applied to a ink jet color facsimile machine of a drum scanning type. Referring to FIG. 5, each picture element forming a color original 102 supported on a drum 101 of a color scanner reflects a beam of light illuminated by a light source 103, which reflected beam of light is transmitted to a color separating means 105 through a lens system 104. The color separating means 105 separates the reflected beam of light into three color (red (R), green (G) and blue (B)) components and then generates electrical signals indicative thereof. The outputs from the color separating means 105 are converted by a logarithmic conversion circuit 106 into electrical color signals indicative of cyan (C), magenta (M) and yellow (Y) corresponding to red, green and blue, respectively, according to the subtractive mixing method, which color signals are then converted into digital color signals by an analog-to-digital converters 107, the digital color signals from the converters 107 being outputed through respective lines 108. Reference numeral 109 represents a color correction calculator to which a coefficient necessary for the correction is supplied through a data line 110. C, M and Y color image signals 111 corrected therein are supplied through delay circuits 112 to digital-to-analog converters 113 whereat they are converted into analog

TABLE 1

Forms of Functions fj (x1, x2, x3)

| j | Group 1 | Group 2 | Group 3 | Group 4 | Group 5 | Group 6 |
|---|---------|---------|---------|---------|---------|---------|
| 1 | x1 | 1 − x1 | log(1 − x1) | logx1 | x1 | 1/x1 |
| 2 | x2 | 1 − x2 | log(1 − x2) | logx2 | x2 | 1/x2 |
| 3 | x3 | 1 − x3 | log(1 − x3) | logx3 | x3 | 1/x3 |
| 4 | x1² | (1 − x1)² | {log(1 − x1)}² | (logx1)² | x1² | 1/x1² |
| 5 | x2² | (1 − x2)² | {log(1 − x2)}² | (logx2)² | x2² | 1/x2² |
| 6 | x3² | (1 − x3)² | {log(1 − x3)}² | (logx3)² | x3² | 1/x3² |
| 7 | x1 · x2 | (1 − x1)(1 − x2) | log(1 − x1) · log(1 − x2) | logx1 · logx2 | x1 · x2 | 1/x1 · x2 |
| 8 | x2 · x3 | (1 − x2)(1 − x3) | log(1 − x2) · log(1 − x3) | logx2 · logx3 | x2 · x3 | 1/x2 · x3 |
| 9 | x3 · x1 | (1 − x3)(1 − x1) | log(1 − x3) · log(1 − x1) | logx3 · logx1 | x3 · x1 | 1/x3 · x1 |
| 10 | 1/x1 | 1/(1 − x1) | 1/log(1 − x1) | 1/logx1 | log(1 − x1) | log(1 − x1) |
| 11 | 1/x2 | 1/(1 − x2) | 1/log(1 − x2) | 1/logx2 | log(1 − x2) | log(1 − x2) |
| 12 | 1/x3 | 1/(1 − x3) | 1/log(1 − x3) | 1/logx3 | log(1 − x3) | log(1 − x3) |
| 13 | 1/x1² | 1/(1 − x1)² | 1/{log(1 − x1)}² | 1/(logx1)² | log(1 − x1) · log(1 − x2) | log(1 − x1) · log(1 − x2) |
| 14 | 1/x2² | 1/(1 − x2)² | 1/{log(1 − x2)}² | 1/(logx2)² | log(1 − x2) · log(1 − x3) | log(1 − x2) · log(1 − x3) |
| 15 | 1/x3² | 1/(1 − x3)² | 1/{log(1 − x3)}² | 1/(logx3)² | log(1 − x3) · log(1 − x1) | log(1 − x3) · log(1 − x1) |
| 16 | 1/x1 · x2 | 1/(1 − x1) · (1 − x2) | 1/log(1 − x1) · log(1 − x2) | 1/logx1 · logx2 | exp(1 − x1) | exp(1 − x1) |
| 17 | 1/x2 · x3 | 1/(1 − x2) · (1 − x3) | 1/log(1 − x2) · log(1 − x3) | 1/logx2 · logx3 | exp(1 − x2) | exp(1 − x2) |
| 18 | 1/x3 · x1 | 1/(1 − x3) · (1 − x1) | 1/log(1 − x3) · log(1 − x1) | 1/logx3 · logx1 | exp(1 − x3) | exp(1 − x3) |
| 19 | 1 | 1 | 1 | 1 | 1 | 1 |

TABLE 2

Values of Reproduction Errors

| Function Groups | 1 (cyan level) | 2 (magenta level) | 3 (yellow level) |
|-----------------|----------------|-------------------|------------------|
| Group 1 | 0.915 | 1.60 | 2.95 |
| Group 2 | 0.921 | 2.94 | 6.63 |
| Group 3 | 2.03 | 4.62 | 3.84 |
| Group 4 | 9.34 | 3.91 | 3.33 |
| Group 5 | 0.853 | 2.23 | 5.80 |
| Group 6 | 1.90 | 2.25 | 3.41 |

As hereinbefore described, it is also possible to set the group of the functions and the coefficient, to make all of signals. A carrier wave 116 generated from a carrier signal generator 114 is amplitude-modulated by modulators 115 in response to the analog signals to form a piezo oscillating wave form for the ink jetting, which are then applied to ink jetting heads 119 through respective output lines 118 of drive circuits 117. Three color inks jetted from the respective ink jetting heads 119 are superimposed on a recording paper 120 supported on a drum 121, thereby reproducing a color image by a series of scanning. The construction described above is conventional except for the provision of the color correction calculator 109.

A specific construction of the color correction calculator 109 of the present invention shown in FIG. 5 will now be described with reference to FIG. 6. The following equation is one example of the multi-term matrix equation utilized in the color correction calculator.

$$\begin{pmatrix} Co \\ mo \\ yo \end{pmatrix} = (aij) \begin{bmatrix} c \\ m \\ y \\ cm \\ my \\ ya \\ c^2 \\ m^2 \\ y^2 \\ k \end{bmatrix}$$

In the above equation, c, m and y represent cyan, magenta and yellow density signals supplied to the calculator, respectively, co, mo and yo represent corresponding output signals after the correction, respectively, and (aij) represents a correction coefficient matrix. In this embodiment, i=1 to 3, and j=1 to 10, and specific correction values are tabulated in Table 3.

TABLE 3

| | i | | |
|---|---|---|---|
| j | 1 | 2 | 3 |
| 1 | 0.33850 | −0.08350 | −0.00060 |
| 2 | −0.03580 | 0.36578 | −0.19116 |
| 3 | 0.00370 | −0.03451 | 0.38391 |
| 4 | 0.01339 | 0.03097 | 0.01862 |
| 5 | 0.00716 | 0.01799 | 0.01513 |
| 6 | −0.00280 | 0.00281 | −0.03300 |
| 7 | −0.07834 | −0.00094 | 0.00350 |
| 8 | −0.00181 | −0.09925 | 0.02150 |
| 9 | −0.00644 | −0.00267 | −0.06317 |
| 10 | 0.00286 | 0.00123 | 0.00864 |

Figure 6:
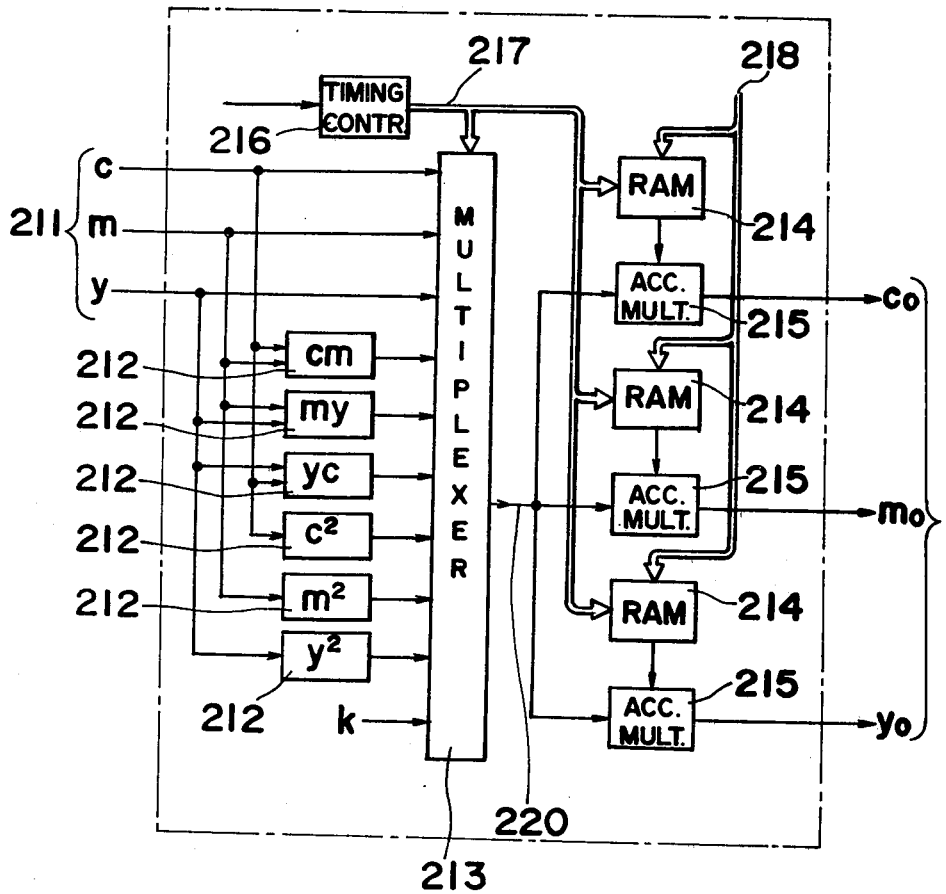
FIG. 6 is a circuit block diagram showing the details of a color correction calculator shown in FIG. 5.

Referring to FIG. 6, c, m and y input lines 211 through which digital signals are supplied are respectively connected to function term generators 212. These function term generators 212 are constituted by either programmble read-only memories or random access memories and are so designed that, while these c, m and y inputs are applied to respective address input lines thereof, the function values of non-linear terms of second degree, such as cm, cy, ca, a², m², y² and others, stored in the function term generators 212 according to the class of these terms can be read out. Reference numeral 213 represents a multiplexer operable to selectively derive inputs of ten terms including first terms c, m and y, second degree terms cm, my, yc, c², m² and y², and a constant term relative to one combination of inputs (c, m and y), which inputs of the ten terms selectively appear on an output line 220 in response to a control signal 217. On the other hand, the correction coefficients (aij) are beforehand set in rewritable random access memories 214 through write-in data lines 218. The function value of each term and the correction coefficients described above are sequentially derived from the multiplexer 213 and the random access memories 214 on a time series basis in accordance with the control signal 217 from a timing control circuit 216, and the matrix calculation of the previously described equation is performed on a time series basis by an accumulating multiplier 215 comprised of digital multipliers and adders to give outputs 219 of corrected co, mo and yo. The embodiment so far described is so constructed as hereinbefore described and is featured in the capability of performing the matrix calculation by dividing the color correction calculation to the function generator for generating multi-term correction functions according to each term and also to the memory wherein the correction coefficients are set. The accumulating multiplier 215 shown in FIG. 6 is a relatively expensive element, but a single accumulating multiplier is sufficient in the present invention for each color since the calculation of each term is carried out on the time series basis. However, it is to be noted that, since the speed of calculation is conversely reduced in the case of the time series basis, and since the calculation speed is further reduced where a high speed calculation is desired, a plurality of accumulating multipliers may be employed in the form as connected in parallel to each other for each term. In the embodiment shown in FIG. 6, as a result that a specific calculation circuit effective to warrant the preciseness wherein each of the c, m and y inputs is 8 bits and the final output (co, mo and yo) is 7 bits has been constructed, about 3 μs is found to be sufficient for each calculation. This is a speed sufficient to effect a real time processing in a generally available color image duplicating device.

It is to be noted that, even in the foregoing embodiment, the multi-term equation has been described as a quadratic equation. However, it may be added with an equation of high degree to simulate a further complicated correction curve. In addition, for each function term, a reciprocal term, a logarithmic term or an exponential function term may be employed other than that used to obtain a high degree of simulation depending on the purpose.

The foregoing arrangement can readily and economically be realized by the use of a recently developed digital integrated circuit component and, therefore, a relatively high preciseness can be warranted as compared with the conventional analog system. Especially in the present invention, it is possible to easily change the contents of each correction function term and the correction coefficient according to optimum conditions required to be attained and also to intensively modify various non-linear deviations contained in the process from the color separation input system to the color recording device, thereby achieving a real time processing and a versatility.

Industrial Applicability of the Invention

The color image duplicating device according to the present invention is applicable in association with a device, such as a color facsimile machine or a color ink jet printer, for recording a color image having a halftone onto a recording medium such as a paper, a cloth or other medium. Where it is applied in association with the ink jet recording device, it can result in a high fidelity color reproduction with no substantial difference in color between the original and the reproduced image.

What is claimed is:
1. A color image duplicating system comprising:
   a color separating means for scanning an original color image and obtaining m color separated vector data input $\overline{X}$ from each picture element,
   a function generating means connected to said color separating means for generating column vector $\overline{F(X)}$ of n rows having as elements thereof n functions wherein each of elements of said m color separated vector data input $\overline{X}$ is a variable, memory means for storing each element of a correction coefficient matrix (A) having l rows and n columns, calculating means connected to said function generating means and memory means for obtaining a column vector $\overline{Y}$ of l rows which is expressed by $\overline{Y}=(A)\overline{F}(\overline{X})$ by the utilization of said correction coefficient matrix (A) and said column vector $\overline{F}(\overline{X})$, and a printing means for recording a color image by combining l primary colors, to which said column vector $\overline{Y}$ outputted from said calculating means is supplied to give a duplicated image of corrected color.

2. A system claimed in claim 1, wherein said printing means is a color ink jet printer.

3. A system as claimed in claim 1, wherein said memory means is a rewritable digital memory.

4. A system as claimed in claim 1, wherein said function generating means is a table memory wherein outputs $\overline{F}(\overline{X})$ relative to possible $\overline{X}$ are stored in the form of a table so that the value of the function $\overline{F}(\overline{X})$ can readily be derived with the inputs $\overline{X}$ used as an address of the table memory.

5. A system as claimed in claim 1, wherein all of said function generating means, said memory means and said calculating means comprise digital memory means wherein outputs $\overline{Y}$ relative to possible $\overline{X}$ are stored in the form of a table so that the outputs $\overline{Y}$ can readily be derived with the inputs $\overline{X}$ used as address data.

6. A system as claimed in claim 4 or 1, wherein the functions $\overline{F}(\overline{X})$ are linear and quadratic equations of $\overline{X}$.

7. A system as claimed in claim 1, wherein said function generating means is a rewritable read-only memory.

8. A system as claimed in claim 1, wherein said function generating means is a rewrite impossible rea-only memory.

9. A system as claimed in claim 1, wherein said calculating means is a serial arithmetic unit capable of multiplying $\overline{F}(\overline{X})$ by (X) in a time series basis.

10. A system as claimed in claim 1, wherein said color separated vector data are data of density signals of m colors in subtractive color mixtures.

11. A system as claimed in claim 1, wherein said memory means is a rewritable random access memory.

12. A system as claimed in claim 1, which further includes means for generating said correction coefficient matrix (A) by:

applying N known signals $\overline{Z}i$ (wherein $i=1, 2, \ldots N$) to said printing means to record N color samples, separating colors of said color samples by said color separator for obtaining N color separated data $\overline{X}i$ (wherein $i=1, 2, \ldots N$), generating column vector $\overline{F}(\overline{X}i)$ by utilizing said color separated data $\overline{X}i$, and determining said matrix (A) in such a manner that the results of calculation of $\overline{Y}i=(A)\overline{F}(\overline{X}i)$ correspond to $\overline{Y}i \simeq \overline{Z}i$ for each other sample.

13. A system as claimed in claim 12, which further includes means for determining the condition $\overline{Y}i \simeq \overline{Z}i$ by minimizing a square of error relative to the N colors expressed by the following formula:

$$\sum_{i=1}^{N} (l\overline{Z}i - \overline{Y}i)^2.$$

* * * * *